US009637607B2

(12) United States Patent
Mahon et al.

(10) Patent No.: US 9,637,607 B2
(45) Date of Patent: May 2, 2017

(54) METHOD OF MAKING FOAM

(71) Applicant: Sealed Air Corporation (US), Duncan, SC (US)

(72) Inventors: William J. Mahon, Southbury, CT (US); Henry J. Ruddy, Sandy Hook, CT (US)

(73) Assignee: Sealed Air Corporation (US), Charlotte, NC (US)

( * ) Notice: Subject to any disclaimer, the term of this patent is extended or adjusted under 35 U.S.C. 154(b) by 297 days.

(21) Appl. No.: 14/080,046

(22) Filed: Nov. 14, 2013

(65) Prior Publication Data
US 2014/0171530 A1 Jun. 19, 2014

Related U.S. Application Data

(60) Provisional application No. 61/728,932, filed on Nov. 21, 2012.

(51) Int. Cl.
C08J 9/12 (2006.01)
C08J 9/30 (2006.01)
C08F 222/10 (2006.01)

(52) U.S. Cl.
CPC ......... C08J 9/122 (2013.01); C08F 222/1006 (2013.01); C08J 2203/06 (2013.01); C08J 2335/02 (2013.01)

(58) Field of Classification Search
CPC .. C08F 222/1006; C08J 9/122; C08J 2203/06; C08J 2335/02
See application file for complete search history.

(56) References Cited

U.S. PATENT DOCUMENTS

| | | |
|---|---|---|
| 3,125,592 A | 3/1964 | Neven |
| 3,224,989 A | 12/1965 | Nevin |
| 3,699,061 A | 10/1972 | Cunningham |
| 3,827,993 A | 8/1974 | Cunningham et al. |
| 3,979,270 A | 9/1976 | Trecker et al. |
| 4,016,059 A | 4/1977 | Trecker et al. |
| 4,025,477 A | 5/1977 | Borden et al. |
| 4,100,318 A | 7/1978 | McCann et al. |
| 4,118,405 A | 10/1978 | Hodakowski et al. |
| 4,143,099 A | 3/1979 | Duncan |
| 4,157,947 A | 6/1979 | Borden et al. |
| 4,201,702 A * | 5/1980 | Blount ............................ 524/66 |
| 4,508,853 A | 4/1985 | Kluth et al. |
| 4,607,087 A | 8/1986 | Moriya et al. |
| 4,734,440 A | 3/1988 | Topcik |
| 4,742,087 A | 5/1988 | Kluth et al. |
| 4,771,078 A | 9/1988 | Schisler et al. |
| 4,965,136 A | 10/1990 | Mueller |
| 5,186,905 A | 2/1993 | Bertram et al. |
| 5,255,847 A | 10/1993 | Sperry et al. |
| 5,688,989 A | 11/1997 | Daute et al. |
| 5,950,875 A | 9/1999 | Lee et al. |
| 6,034,197 A | 3/2000 | Mahon et al. |
| 6,121,398 A | 9/2000 | Wool et al. |
| 6,353,037 B1 | 3/2002 | Thunhorst et al. |
| 6,465,535 B1 | 10/2002 | Elsman |
| 6,548,609 B2 | 4/2003 | Ramirez-de-Arellano-Aburto et al. |
| 6,649,667 B2 | 11/2003 | Clatty |
| 6,713,522 B2 | 3/2004 | Zhang et al. |
| 6,730,768 B2 | 5/2004 | Heidbreder et al. |
| 6,811,059 B2 | 11/2004 | Piucci, Jr. et al. |
| 6,900,261 B2 | 5/2005 | Wool et al. |
| 6,929,193 B2 | 8/2005 | Ruddy |
| 6,996,956 B2 | 2/2006 | Sperry et al. |
| 7,125,950 B2 | 10/2006 | Dwan'Isa et al. |
| 7,256,250 B2 | 8/2007 | Tuominen et al. |
| 7,691,914 B2 | 4/2010 | Abraham et al. |
| 7,691,946 B2 | 4/2010 | Liu et al. |
| 7,696,370 B2 | 4/2010 | Suppes et al. |
| 7,786,239 B2 | 8/2010 | Petrovic et al. |
| 7,846,987 B2 | 12/2010 | Handa |
| 2002/0128338 A1 | 9/2002 | Hird et al. |
| 2005/0138891 A1 | 6/2005 | Wool et al. |
| 2005/0239915 A1 | 10/2005 | Provan |

(Continued)

FOREIGN PATENT DOCUMENTS

| | | |
|---|---|---|
| EP | 0781807 A2 | 7/1997 |
| EP | 1153974 A1 | 11/2001 |

(Continued)

OTHER PUBLICATIONS

Laetitia M. Bonnaillie, "Bio-Based Polymeric Foam From Soybean Oil" (Dissertation; Fall 2007) (published online in 2007 as Dissertation No. 3291707 by ProQuest Dissertations & Theses).
Wu et al. "Plastic Foam Based on Acrylated Epoxidized Soybean Oil", J. Biobased Mtls & Bioenergy, vol. 1, 417-426 (2007).
Bonnaille et al, "Thermosetting Foam with a High Bio-Based Content ... " J. Applied Polymer Science, vol. 105, 1042-52 (2007).
Scala et al, "Property Analysis of Triglyceride-based Thermosets", Science Direct, Polymer 46 (2005) 61-69.
Rong et al, "Ecomaterials-Foam Plastics Synthesized From Plant Oil-Based Resins", Materials Science Forum, vols. 539-543 (2007) pp. 2311-2316.

(Continued)

Primary Examiner — Irina S Zemel
(74) Attorney, Agent, or Firm — Daniel B. Ruble

(57) ABSTRACT

A method of making a foam from a polymerizable resin includes the following steps. A thermally-activated initiator having a temperature below the initiation temperature is combined with an elevated-temperature solution having the polymerizable resin and carbon dioxide at a temperature above a promoted temperature to create a resulting mixture having a temperature above the promoted temperature. The resulting mixture is expanded by decreasing the pressure of the mixture to create a froth having a plurality of cells formed by carbon dioxide that expanded out of solution. The polymerizable resin within the froth is cured to create a foam.

20 Claims, 2 Drawing Sheets

(56) References Cited

U.S. PATENT DOCUMENTS

| | | |
|---|---|---|
| 2006/0063850 A1 | 3/2006 | Kanae et al. |
| 2008/0004369 A1 | 1/2008 | Seppala |
| 2009/0029143 A1 | 1/2009 | Kanae et al. |
| 2009/0270525 A1 | 10/2009 | Yamamoto et al. |
| 2010/0317760 A1 | 12/2010 | Tanguay et al. |
| 2012/0295993 A1 | 11/2012 | Wool |

FOREIGN PATENT DOCUMENTS

| | | |
|---|---|---|
| WO | 2008103012 A1 | 8/2008 |
| WO | 2013077865 A1 | 5/2013 |

OTHER PUBLICATIONS

Bonnaillie et al, "Fabrication of Structural Foams From Soybean Oil Formulation", University of Delaware 2001, 1 page.
Wool et al, "Bio-Based Resins and Natural Fibers", vol. 21, ASM Handbook, ASM International, pp. 184-193 (2001).
Bonnaillie, "Bio-Based Polymeric Foam from Soybean Oil" (Dissertation; Fall 2007) (published online in 2007 as Dissertation No. 3291707 by ProQuest Dissertations & Theses) 255 pages.

\* cited by examiner

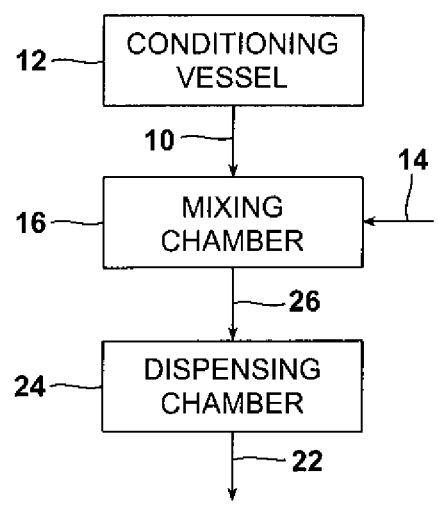
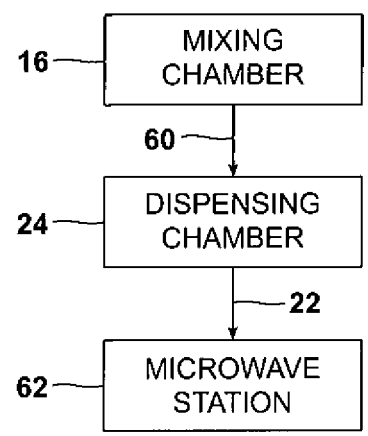
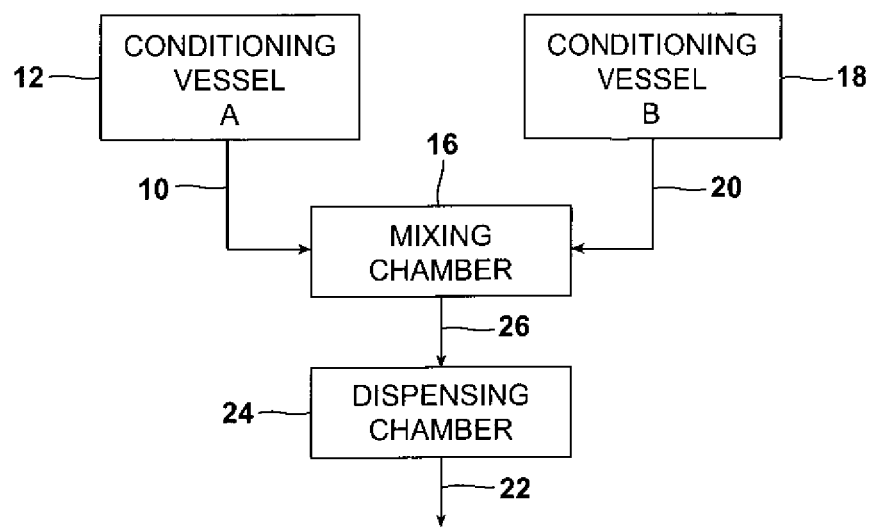

METHOD OF MAKING FOAM

This application claims under 35 U.S.C. §119(e) the benefit of U.S. Provisional Application No. 61/728,932 filed Nov. 21, 2012, which is incorporated herein in its entirety by reference.

The presently disclosed subject matter relates to methods of making foam (i.e., cellular plastic), for example, foam produced using one or more sustainably produced reactants.

BACKGROUND

It is known to produce foam from a reactive mixture of one or more polyols and one or more isocyanates, for example as disclosed in U.S. Pat. No. 6,034,197, which is incorporated herein in its entirety by reference. Suitable systems for making and/or dispensing such foams are described, for example, in U.S. Pat. Nos. 5,186,905; 5,255,847; 5,950,875; 6,811,059; 6,929,193; and 6,996,956, each of which is incorporated herein in its entirety by reference. However, in some instances it may be desirable to make foam without the need to use isocyanate reactants, such as those used in formulating polyurethane foams.

SUMMARY

One or more embodiments of the presently disclosed subject matter may address one or more of the aforementioned problems.

A method of making a foam from a polymerizable resin includes the following steps. In step (i), a thermally-activated initiator having a given initiation temperature and a given promoted temperature, is provided. The temperature of the initiator is below the initiation temperature. In step (ii), an elevated-temperature solution having a given amount of the polymerizable resin and carbon dioxide, and optionally promoter, is provided. The temperature of the elevated-temperature solution is above the promoted temperature. In step (iii), the initiator of step (i) is combined at a mixing pressure with the solution of step (ii) to form a mixture having a temperature above the promoted temperature. In step (iv), the mixture is expanded by decreasing the pressure of the mixture to below the mixing pressure to create a froth having a plurality of cells formed by carbon dioxide that expanded out of solution. In step (v), the polymerizable resin within the froth is cured to create a solidified matrix encasing the plurality of cells.

These and other objects, advantages, and features of the presently disclosed subject matter will be more readily understood and appreciated by reference to the detailed description and the drawings.

BRIEF DESCRIPTION OF THE DRAWINGS

FIG. 1 is a representative schematic diagram of an embodiment of the presently disclosed subject matter;

FIG. 2 is a representative schematic diagram of an alternative embodiment of the presently disclosed subject matter;

FIG. 4 is a representative schematic diagram of another alternative embodiment of the presently disclosed subject matter.

Figure 3:
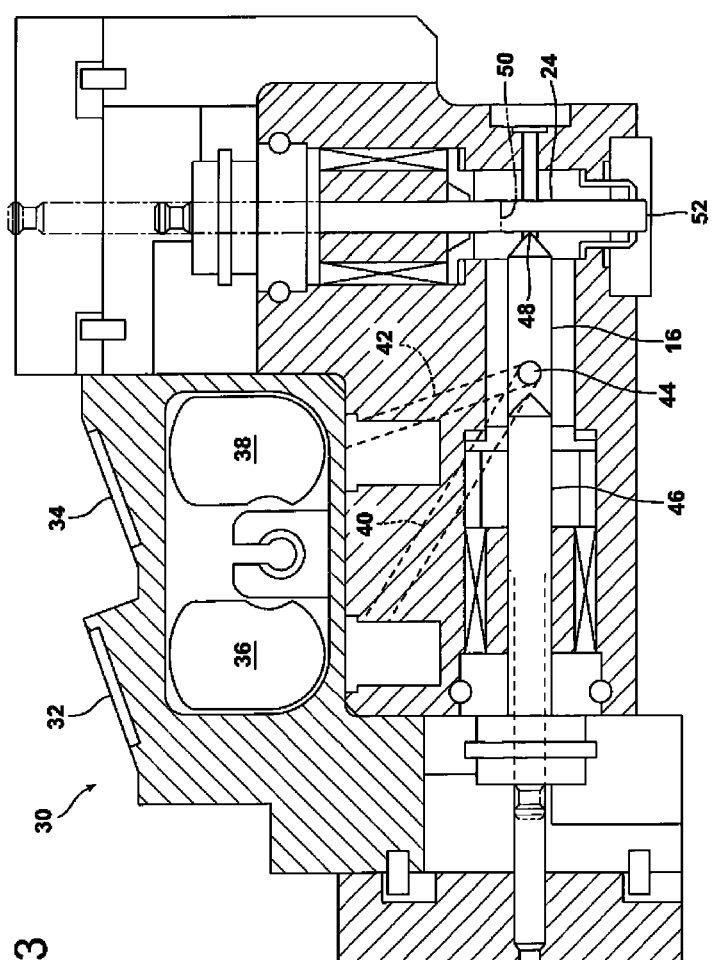
FIG. 3 is a representative side elevation sectional view of an embodiment of a device 30 of the presently disclosed subject matter.

Various aspects of the subject matter disclosed herein are described with reference to the drawings. For purposes of simplicity, like numerals may be used to refer to like, similar, or corresponding elements of the various drawings. The drawings and detailed description are not intended to limit the claimed subject matter to the particular form disclosed. Rather, the intention is to cover all modifications, equivalents, and alternatives falling within the spirit and scope of the claimed subject matter.

DETAILED DESCRIPTION

Various embodiments of the presently disclosed subject matter are directed to methods of making foam. In several embodiments, a thermally-activated initiator is combined with a solution comprising a polymerizable resin and carbon dioxide dissolved in the polymerizable resin, optionally with co-reactant.

Polymerizable Resin

"Polymerizable resin" as used herein refers to reactive molecules having three or more sites of ethylenic unsaturation that participate in forming covalent bonds during the free radical polymerization (i.e., have a functionality of three or more) to form larger molecules comprising multiples of the reactive molecules.

The polymerizable resin may have a bio-carbon content of at least 50%, for example at least 70%, where the percent bio-carbon is defined as 100×(number of bio-derived carbon atoms/total number of carbon atoms), where the bio-derived carbon atoms are derived from biological sources.

The polymerizable resin may comprise one or more of any of triacrylate and tetra-acrylate. Triacrylate is a molecule having three acrylate functionality sites. Tetra-acrylate is a molecule having four acrylate functionality sites. Useful triacrylates and tetra-acrylates include, for example, one or more of trimethylolpropane triacrylate, ethoxylated trimethylolpropane triacrylate, pentaerythritol tetraacrylate, ethoxylated pentaerythritol tetraacrylate, polyester triacrylate, polyester tetra-acrylate, fatty acids and/or fatty acid esters having acrylate functionality, and mono-, di-, and/or triglycerides having acrylate functionality.

The polymerizable resin may comprise triglyceride having acrylate functionality, for example, acrylated epoxidized triglyceride. Useful triglyceride having acrylate functionality may comprise triglyceride derived from plant, such as one or more of any of soybean oil, linseed oil, castor oil, cotton oil, corn oil, sunflower oil, palm oil, peanut oil, rapeseed oil, olive oil, and canola oil. Useful triglyceride having acrylate functionality may comprise triglyceride derived from animal, such as fish oil.

As is known in the art, the reactive sites (e.g., the carbon double bonds in the fatty acid chains) of a triglyceride may be epoxidized to create epoxidized sites, which may then be acrylated (i.e., reacted with an acrylic acid, methacrylic acid, acrylate, or methacrylate), for example, to create acrylated epoxidized triglyceride, for example acrylated epoxidized soybean oil (AESO) or acrylated epoxidized linseed oil (AELO). Useful triacrylates having acrylate functionality, such as AESOs, are disclosed for example in International Patent Application Publication WO2013/077865 A1 published May 30, 2013 (from International Patent Application PCT/US2011/61915) to Speer et al, which is incorporated herein in its entirety by reference.

As used herein, "acrylate" includes acrylates, methacrylates, and molecules having combinations of acrylate and methacrylate functionalities. "Acrylate functionality" includes functionality provided by any of acrylate and methacrylate moieties. "Acrylate moieties" includes acrylate and methacrylate moieties. As used in this context, "acrylate functionality" refers to the number of acrylate moieties on the triglyceride molecule. Useful triglyceride having acrylate functionality for use as polymerizable resin may have an acrylate functionality of any one of 3, at least 3, and 4.

The polymerizable resin may comprise unsaturated polyester resin with ethylenic unsaturation stemming from maleic, fumaric, and/or itaconic acids and/or anhydrides. The polymerizable resin may comprise acrylated epoxidized novolac resins.

The polymerizable resin may comprise molecules having a functionality of three in an amount of at least any of 50, 60, 70, 80, 90, and 95%; and/or at most any of 99, 95, 90, 80, 70, and 60%, based on the weight of the polymerizable resin.

The polymerizable resin may comprise molecules having a functionality of four in an amount of at least any of 5, 10, 15, 20, 30, 40, and 50%; and/or at most any of 60, 50, 40, 30, 20, 15, and 10%, based on the weight of the polymerizable resin.

The polymerizable resin may comprise triglyceride having acrylate functionality in an amount of at least any of 50, 60, 70, 80, 90, and 95%; and/or at most any of 99, 95, 90, 80, 70, and 60%, based on the weight of the polymerizable resin.

Co-Reactants

A "co-reactant" is a molecule having two or fewer sites of ethylenic unsaturation that participate in forming covalent bonds during the free radical polymerization of the polymerizable resin (i.e., have a functionality of two or one). The co-reactant may be reactive diluent, that is, co-reactant that can act to lower the viscosity of a solution comprising the polymerizable resin (i.e., act as a solvent or diluent for the polymerizable resin). A co-reactant may be selected to improve one or more characteristics of the cured polymerizable resin, such as tensile strength, compressive strength, toughness, and/or modulus.

Useful co-reactants comprise one or more of styrene, alpha-methyl styrene, vinyl toluene, diallyl phthalate, diallyl isophthalate, diallyl maleate, and acrylate.

The co-reactant may comprise acrylate, that is, one or more of monoacrylate and diacrylate. The co-reactant may comprise monoacrylate, that is, molecules having a single acrylate functionality site. Useful monoacrylates include one or more of iso-bornyl acrylate, fatty alcohol monoacrylate (e.g., lauryl acrylate), cyclohexyl monoacrylates, ethoxylated phenol monoacrylates (e.g., four-mole ethoxylated nonyl phenol acrylate), epoxy acrylates (e.g., glycidyl methacrylate), and acrylated fatty acid ester.

The co-reactant may comprise diacrylate, that is, molecules having two acrylate functionality sites. Useful diacrylates include, for example, one or more of polyethylene glycol diacrylates, polypropylene glycol diacrylates, bisphenol A diacrylates, diacrylates derived from vegetable oil, and polyester diacrylates.

Useful polyethylene glycol diacrylate include PEG 200 diacrylate, PEG 400 diacrylate, and PEG 1000 diacrylate where the numbers represent the average molecular weight of the PEG segment.

Useful polypropylene glycol diacrylates include dipropylene glycol diacrylate, and tripropylene glycol diacrylate.

Useful bisphenol A diacrylates include ethoxylated bisphenol A diacrylate, such as those having 2, 3, and 4 or more moles of ethoxylation, and including bisphenol diacrylates and bisphenol A dimethacrylates.

Useful polyester diacrylates include polyester segments comprising aliphatic and aromatic moieties. When a more rigid foam is desired, polyester segments can be chosen that have a glass transition temperature ($T_g$) that is greater than room temperature. Similarly when a more flexible foam is desired the polyester segments can be selected with a $T_g$ below room temperature. Preferred polyester acrylates may include bio-carbon content for example via the inclusion of poly(lactic acid) segments.

The amount of co-reactant relative the polymerizable resin may be at least any one of 5, 6, 7, 8, 10, 12, 15, 17, and 20 weight parts of the co-reactant; and/or at most any one of 90, 80, 70, 60, 55, 50, 40, and 30 weight parts of the co-reactant relative to 100 weight parts of the polymerizable resin.

The co-reactant may comprise an amount of acrylate (e.g., an amount of any of one or more of monoacrylate and/or diacrylate) of at least, and/or at most, any of 10, 20, 30, 40, 50, 60, 70, 80, 90, 95, and 99%, based on the weight of the co-reactant. The co-reactant may comprise monoacrylate, for example, of at least any of 1, 5, 10, 15, and 20%; and/or at most any of 40, 30, 20, 10, and 5%, based on the weight of the co-reactant. The co-reactant may comprise an amount of diacrylate, for example, of at least any of 6, 7, 8, 10, 12, 15, 17, and 20%; and/or at most any of 60, 55, 50, 40, 30, 20, and 10%, based on the weight of the co-reactant.

Carbon Dioxide

The solution comprising polymerizable resin comprises carbon dioxide dissolved in the polymerizable resin. The solubility of carbon dioxide with polymerizable resin will typically increase with increasing pressure. One or more additional gases may be incorporated with carbon dioxide in the method, for example, nitrogen and/or water.

Initiator

The thermally-activated initiator (i.e., "initiator") is an agent used as a source of free radicals to start the polymerization reaction of the polymerizable resin. A thermally-activated initiator is one that thermally decomposes to produce the radicals that initiate the polymerization reaction. The half life of an initiator is characterized as the time required to reduce the original initiator concentration of a solution by 50%, at a given temperature. As used herein, the "initiation temperature" of a thermally-activated initiator is the temperature corresponding to a ten-hour half life of the initiator using benzene solvent (0.2M concentration) or equivalent. For example, the initiation temperature of dilauroyl peroxide (i.e., without promoter) is 62° C.

One or more promoters (also known as accelerators) may optionally be used to increase the activity of the initiator. As used herein, the "promoted temperature" of a thermally-activated initiator is the temperature corresponding to a ten-hour half life of the initiator using benzene solvent (0.2M concentration) or equivalent, in the presence of the promoter in the same weight ratio (weight parts promoter to million weight parts initiator) that is used in the method. If no promoter is used in the method, then the "promoted temperature" is the same temperature as the "initiation temperature."

Useful thermally-activated initiators include one or more of azo compounds and organic peroxides, such as one or more of any of diacyl peroxides (such as dilauroyl peroxide or dibenzoyl peroxide) dialkyl peroxides (such as dicumyl peroxide), tert-butyl benzoyl peroxide, peroxyesters, peroxydicarbonates, hydroperoxides, peroxymonocarbonates, peroxyketals, and methyl ethyl ketone peroxide. Useful peroxides and their corresponding ten-hour half life temperatures are disclosed, for example, in U.S. Pat. No. 4,143,099 to Duncan and U.S. Pat. No. 4,607,087 to Moriya et al, each of which is incorporated herein in its entirety by reference.

The thermally-activated initiator may comprise more than one type of thermally-activated initiator, for example, a first thermally-activated initiator and a second thermally-activated initiator, where the initiation temperature of the first initiator is lower than the second initiator, for example, lower by any of the following: 10° C., 20° C., and 30° C.

The amount of thermally-activated initiator may be at least, and/or at most, any one of 0.1, 0.5, 1, 1.5, 2, 3, 4, and 5 weight parts thermally-activated initiator relative 100 weight parts of the polymerizable resin.

One or more promoters (also know as accelerators) may be used in combination with the initiator. Useful promoters include transition metal salts and tertiary amines, such as aromatic tertiary amines such as N-(2-hydroxylethyl)-N-methyl-p-toluidine. Useful amounts of promoter range from at least any of 100, 200, and 300 weight parts promoter per million weight parts initiator; and/or at most any of 1,200; 1,000; 800; and 500 weight parts promoter per million weight parts initiator.

Additional Components

The method may optionally comprise incorporating one or more additional components in any of the solutions and/or mixtures.

One or more surfactants may optionally be incorporated into any of the solutions and/or mixtures of the methods. Useful surfactants include any of one or more of polysiloxanes (i.e., silicone surfactants and ethoxylated polysiloxane), ethoxylated fatty acids, salts of fatty acids, ethoxylated fatty alcohols, salts of sulfonated fatty alcohols, and fatty acid ester sorbitan ethoxylates (e.g., polysorbates available from Croda under the Tween trade name).

The amount of surfactant may be at least any one of 0.01, 0.05, 0.1, 0.2, 0.3, and 0.4 weight parts surfactant, and/or at most any of 3, 1, 0.7, and 0.4 weight parts surfactant, relative 100 weight parts of the polymerizable resin.

One or more additives may optionally be incorporated into any of the solutions and/or mixtures of the methods. Useful additives include one or more of any of nucleating and/or reinforcing agent (e.g., cellulosic material such as cellulose fiber, wood pulp, powdered paper, starch, natural clays and modified intercalated clays, and nanoparticles), flame retardant (e.g., ATH), aging modifier (e.g., fatty acid ester, fatty acid amide, hydroxyl amide), pigment, colorant, antioxidant, stabilizer, fragrance, and odor masking agent. The nucleating agent may assist in controlling the size of foam cells. The stabilizer may enhance dimensional stability of the foam. Exemplary stabilizers include amides and esters of C(10-24)fatty acids, stearyl stearamide, glyceromonostearate, glycerol monobehenate, and sorbitol monostearate.

Manufacture of the Foam

In an embodiment of a method of making the foam (FIG. 1), an elevated-temperature solution 10 is provided for example from conditioning vessel 12, the elevated temperature solution having a given amount of the polymerizable resin and carbon dioxide, optionally together with co-reactant and/or promoter. The temperature of the elevated-temperature solution is above the promoted temperature (defined above) of the thermally-activated initiator 14, which may be separately provided. For example, the temperature of the elevated-temperature solution may be at least any one of 25, 35, 50, 75, 100, 120, 150, and 175° C. The elevated-temperature solution may be made in conditioning vessel 12 at elevated pressure, for example, a pressure of at least any one of 100, 200, 300, 350, 500, and 800 psig. The components of the elevated-temperature solution are preferably mixed sufficiently to distribute and disperse the components using methods known to those of skill in the art. For example, the components may be mixed into solution by stirring in a mixing vessel or extruding in an extrusion mixer. The carbon dioxide may be infused into the solution using an infuser. When the method incorporates the use of a promoter, the temperature of the elevated-temperature solution may be provided toward the lower end of the range provided above.

The thermally-activated initiator 14 is provided at a temperature below its initiation temperature (defined above). For example, the initiator may be provided at a temperature of at most any of 20, 25, 35, 40, and 45° C. The elevated-temperature solution 10 and the thermally-activated initiator 14 may be combined in a mixing chamber 16 at a mixing pressure of, for example, at least any one of 100, 200, 300, 350, 500, and 800 psig, to form a resulting mixture having a temperature above the promoted temperature of the thermally-activated initiator, for example, at a mixing temperature of any one of at least 10, 20, 30, 40, 50, and 60° C. above the promoted temperature of the thermally-activated initiator. As a result, the curing reaction begins upon mixing, for example, within the mixing chamber 16.

In another embodiment of the method (FIG. 2), the thermally-activated initiator may be provided for example from conditioning vessel 18 as a component of a lower-temperature solution 20 comprising a supplemental amount of the polymerizable resin and carbon dioxide, and optionally with co-reactant. The temperature of the lower-temperature solution is below the initiation temperature of the initiator. For example, the lower-temperature solution may be provided at a temperature of at most any of 20, 25, 35, 40, and 45° C. The lower-temperature solution may be made in conditioning vessel 18 at elevated pressure, for example, a pressure of at least any one of 100, 200, 300, 350, 500, and 800 psig, using any of the techniques described above in reference to the elevated-temperature solution.

The elevated-temperature solution 10 and the lower-temperature solution 20 may be combined at a mixing pressure of, for example, at least any one of 100, 200, 300, 350, 500, and 800 psig, for example in mixing chamber 16 to form a resulting mixture having a temperature above the promoted temperature of the thermally-activated initiator, for example, at a mixing temperature of any one of at least 10, 20, 30, 40, 50, and 60° C. above the promoted temperature of the thermally-activated initiator. As a result, the curing reaction begins upon mixing, for example, within the mixing chamber 16.

The step of combining the elevated-temperature solution 10 and the thermally-activated initiator 14 (or the lower-temperature solution 20) may occur in mixing chamber 16. For example, a stream of the initiator 14 may be impinged or entrained with a stream of the elevated-temperature solution 10. (FIG. 1.) Also by example, a stream of the lower-temperature solution 20 may be impinged or entrained with a stream of the elevated-temperature solution 10. (FIG. 2.)

Simultaneously or soon after the mixing, the resulting mixture 26 is expanded to create a froth 22, for example, by a sudden reduction in pressure. The mixture may be expanded to the froth by expanding from, for example, any one of the mixing pressures listed in the previous paragraphs, to a pressure below the mixing pressure, for example, ambient atmospheric pressure. The pressure may be reduced by at least any of the following: 100, 200, 300, 400, 500, and 800 psi.

A "froth" is the expanded mixture at the initial period of the curing process (i.e., polymerization process) comprising the polymerizable resin, co-reactants, and other components and a plurality of cells within the mixture created by the carbon dioxide and other gases that have come out of solution or have vaporized in response to the decrease in pressure. The froth exists before curing has been completed.

The step of expanding the resulting mixture 26 to create the froth 22 may occur by discharging the mixture directly from the mixing chamber 16 to ambient conditions (not illustrated), or alternatively by discharging the mixture into a dispensing chamber 24. In the latter case, the froth 22 may then be discharged from the dispensing chamber 24 to allow the curing process to proceed to completion and create the foam outside of the dispensing chamber.

The polymerizable resin along with any of the co-reactants within the froth are cured to create a solidified matrix surrounding or encasing the cellular structure of the plurality of cells to create the foam. Where the thermally-activated initiator comprises a first thermally-activated initiator that activates at a first initiation temperature lower than a second initiation temperature of a second thermally-activated initiator, then the temperature of the mixture or froth may be elevated in a controlled fashion to help control the rate of the curing reaction, as well as potentially extend the curing reaction. Typically the curing is exothermic, so that the temperature of the system will typically rise after initiation of the curing reaction.

In an embodiment of the presently disclosed subject matter, FIG. 3 illustrates a device 30 for making and dispensing froth 22. Inlet 32 provides an inlet for the elevated-temperature solution, for example, from its conditioning vessel (not illustrated). Inlet 34 provides an inlet for the thermally-activated initiator or the lower-temperature solution (comprising initiator) from its conditioning vessel (not illustrated). The flow of the elevated-temperature solution may be controlled by valve 36; and the flow of the initiator or lower-temperature solution may be controlled by valve 38. The elevated-temperature solution may flow from the inlet 32 as controlled by valve 36 through conduit 40 to and through mixing chamber inlet 44 to enter the mixing chamber 16. The initiator or lower-temperature solution may flow from the inlet 34 as controlled by valve 38 through conduit 42 to and through mixing chamber inlet 44 to enter the mixing chamber 16. Although illustrated as a single mixing chamber inlet 44, alternatively each of the conduits 40 and 42 may have an independent inlet (not illustrated) into the mixing chamber 16.

Mixing chamber valving rod 46 is movable within mixing chamber 16 from an open position, as shown in FIG. 3, in which inlet 44 is open, to a closed position (not illustrated) in which the inlet 44 is closed. In the closed position, valving rod 46 may extend to the exit 48 of mixing chamber 16. The movement of the mixing chamber valving rod may be controlled by an actuator (not illustrated). In the open position, the valving rod 46 is withdrawn so that it does not block the inlet 44 so that the streams from conduits 40 and 42 may enter into and mix with and/or impinge upon each other within the mixing chamber 16. In the closed position, the valving rod 46 extends to cover and block (i.e., close) the inlet 44 so that there is no flow of material from the conduits 40 and 42.

The mixing chamber 16 is in fluid communication with the dispensing chamber 24 through exit 48. The size of chamber exit 48 (e.g., an exit port) is selected to restrict the rate of flow of mixture from the mixing chamber 16 and to retain an elevated pressure within the mixing chamber 16 by virtue of the constricted flow. As the mixture passes through exit 48, the pressure drops, for example to less than the mixing pressure, for example less than 100 psig, for example to ambient atmospheric pressure. When the mixing chamber valving rod 46 is extended to the closed position, the valving rod may block exit 48.

Dispensing chamber valving rod 50 is moveable within dispensing chamber 24 from an open position, as shown in FIG. 3, in which exit 48 is open, to a closed position (not illustrated) in which exit 44 is closed. In the closed position, dispensing chamber valving rod 50 may extend to the outlet 52 of the dispensing chamber 24. The movement of the dispensing chamber valving rod 50 may be controlled by an actuator (not illustrated). In the open position, the valving rod 50 is withdrawn so that it does not block the exit 48 from the mixing chamber so that the mixture from the mixing chamber may flow from the mixing chamber 16 through exit 48 into dispensing chamber 24, where it may expand into a froth. In the closed position, the valving rod 50 extends to cover and block (i.e., close) the chamber exit 48 so that there is no flow of material from the mixing chamber.

The residue of the mixture 26 from the mixing chamber 16 and residue of the froth 22 from the dispensing chamber 24 may be purged, for example, mechanically purged by a the extension of the mixing chamber valving rod 46 (e.g., to the closed position) and the extension of dispensing chamber valving rod 50 (e.g., to the closed position), respectively, to push the residue from the respective chamber.

In operation, the device 30 may move through a mixing/dispensing cycle and a termination cycle to produce froth in desired amounts upon demand. For example, during the mixing/dispensing cycle the mixing chamber valving rod 46 is in the open position and the dispensing chamber valving rod 50 is in the open position, so that the elevated-temperature solution and the initiator (or the lower-temperature solution comprising the initiator) may flow into the mixing chamber 16 to impinge and mix with each other to create a mixture at a relatively higher mixing pressure, and flow through the restricted exit 48 into dispensing chamber 24 to expand into the relatively lower pressure (i.e., below the mixing pressure) within the dispensing chamber 24 where the mixture expands to create a froth 22 that flows out exit 52 as the froth expands.

After an appropriate time, the device is moved to the termination cycle, in which the mixing chamber valving rod 46 is moved to the closed position, to purge the mixing chamber so that the remainder of mixture 26 within mixing chamber 16 moves (e.g., is pushed) from the mixing chamber 16 through the exit 48. The dispensing chamber valving rod 50 is then moved to the closed position to purge the dispensing chamber 24 by pushing the remainder of the froth from the dispensing chamber 24 out of the outlet 52 of the dispensing chamber.

The froth exits the device 30 where it is cured outside of the device 30 to create the foam having a solidified matrix encasing a plurality of cells. To begin the cycle again, the dispensing chamber valving rod 50 is moved to the open position and the mixing chamber valving rod 46 is moved to the open position.

Useful chambers, ports, valving rods, and related equipment for mixing and dispensing reactant streams of chemicals in the manufacture of foam are disclosed, for example, in U.S. Pat. No. 5,186,905 to Bertram et al; U.S. Pat. No. 5,950,875 to Lee et al; U.S. Pat. No. 6,811,059 to Piucci et al; and U.S. Pat. No. 6,996,956 to Sperry et al; each of which is incorporated herein in its entirety by reference.

In another embodiment of a method of making foam (FIG. 4), a solution 60 is provided comprising the polymerizable resin, the thermally-activated initiator, and carbon dioxide, optionally together with co-reactants and/or promoter. The solution 60 may be made by mixing the components in mixing chamber 16 at an elevated pressure, for example, a pressure of at least any one of 100, 200, 300, 350, 500, and 800 psig. The components of the solution are preferably mixed sufficiently to distribute and disperse the components using methods known to those of skill in the art. For example, the components may be mixed into solution by stirring in a mixing vessel or extruding in an extrusion mixer. The carbon dioxide and other gases may be infused into the solution using an infuser.

The solution 60 is provided at a temperature below the promoted temperature of the initiator. For example, the solution may be provided at a temperature of at most any of 20, 25, 35, 40, and 45° C. The solution 60 is expanded to create a froth comprising a plurality of cells formed by carbon dioxide that expanded out of solution, for example, by a sudden reduction in pressure. The solution may be expanded to the froth by expanding from, for example, any one of the elevated pressures listed in the previous paragraphs, to a pressure below the elevated pressure, for example, ambient atmospheric pressure. The pressure may be reduced by at least any of the following: 100, 200, 300, 400, 500, and 800 psi. The expansion of the solution may occur in a dispensing chamber 24 at the reduced pressure, for example, a pressure of less than 100 psig or at ambient atmospheric pressure.

Simultaneously or soon after the expansion, the froth 22 is exposed to microwave radiation at station 62 to heat the froth above the promoted temperature of the initiator. This initiates the curing reaction of the polymerizable resin and optional co-reactants within the froth to create a foam having a solidified matrix encasing the plurality of cells. The step of exposing to microwave radiation may occur by directing microwave radiation toward a stream of the froth as the stream passes through the bore of a housing. The froth may be dispensed from the dispensing chamber to create the foam outside of the dispenser chamber. The microwave station may comprise a microwave oven, such that the froth may be passed through the microwave oven.

Additional disclosures regarding the embodiments related to FIG. 4 are made in the following sentences.

A. A method of making a foam, the method comprising:
  (i) providing a solution comprising:
    a polymerizable resin;
    a thermally-activated initiator having a given promoted temperature;
    carbon dioxide; and
    optionally a promoter, wherein the temperature of the solution is below the promoted temperature of the initiator;
  (ii) expanding the solution to create a froth comprising a plurality of cells formed by carbon dioxide that expanded out of solution; and
  (iii) exposing the froth to microwave radiation to heat the froth above the promoted temperature of the initiator; and
  (iv) curing the polymerizable resin to create a foam having a solidified matrix encasing the plurality of cells.

B. The method of sentence A wherein:
  the solution is provided by mixing the polymerizable resin, the initiator, and carbon dioxide in a mixing chamber at a pressure of at least 100 psig, preferably any one of at least 200, 300, 350, 500, and 800 psig; and
  the expanding step (ii) occurs in a dispensing chamber having a pressure less than 100 psig.

C. The method of sentence B further comprising dispensing the froth from the dispensing chamber to create the foam of step (iv) outside of the dispenser chamber.

D. The method of any one of sentences A to C wherein the method is conducted continuously.

E. The method of any one of sentences A to C wherein the expanding step (ii) occurs intermittently.

F. The method of any one of sentences A to E wherein the polymerizable resin comprises triglyceride having acrylate functionality.

G. The method of any one of sentences A to F wherein the solution further comprises co-reactant.

H. The method of sentence G wherein the co-reactant comprises an acrylate.

I. The method of any one of sentences A to H wherein the temperature of the solution of the providing step (i) is at most 45° C., preferably at most any one of 40, 35, 25, and 20° C.

J. The method of any one of sentences A to I wherein the exposing step (iii) comprises directing microwave radiation toward a stream of the froth as the stream passes through the bore of a housing.

K. The method of any one of sentences A to J wherein the solution of step (i) comprises one or more promoters.

With any of the embodiments disclosed herein, the manufacture of the foam may occur relatively continuously. Alternatively, the manufacture of the foam may occur intermittently, for example, by combining incremental portions of the elevated-temperature solution with the initiator or the lower-temperature solution, such that the manufacture occurs to produce only desired portions of the foam "on demand."

Foam

The resulting foam (i.e., cellular plastic) may have a density of at most, and/or at least, any one of 0.25, 0.5, 1.0, 1.5, 2.0, 2.5, 3.0, 4.0, 6.0, and 7.0 pounds per cubic foot (pcf). For protective packaging (e.g., cushioning) applications, lower densities are preferred. Unless otherwise noted, the density of the foam as used herein is the apparent density measured according to ASTM DI622-08, which is incorporated herein in its entirety by reference.

The resulting foam may have a compressive strength at 50% strain of at least any of the following: 0.5, 0.8, 1.0, 1.5, 2.0, and 2.5 psi, for example at from 10 to 50% compression. As used herein, the compressive strength is measured according to ASTM 1621-00, as modified by reference to 50% strain.

The foam may have a configuration, for example, of any of a sheet, plank, slab, block, board, and molded shape. The foam may be used for any one or more of void fill, blocking or bracing, thermal insulation, cushioning, sound insulation or vibration dampening.

In preferred embodiments, the mixtures used to make the foam are free of isocyanate reactants, such as those used in formulating polyurethane foams, so that the final foam of the present disclosure is free from isocyanates or isocyanate residues.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A method of making a foam from a polymerizable resin, the method comprising:
   (i) providing a thermally-activated initiator having a given initiation temperature and a given promoted temperature, wherein the temperature of the initiator is below the initiation temperature;
   (ii) providing an elevated-temperature solution comprising a given amount of the polymerizable resin and carbon dioxide, and optionally promoter, wherein the temperature of the elevated-temperature solution is above the promoted temperature;
   (iii) combining at a mixing pressure the initiator of step (i) with the solution of step (ii) to form a mixture having a temperature above the promoted temperature;
   (iv) expanding the mixture by decreasing the pressure of the mixture to below the mixing pressure to create a froth comprising a plurality of cells formed by carbon dioxide that expanded out of solution; and
   (v) curing the polymerizable resin within the froth to create a solidified matrix encasing the plurality of cells.

2. The method of claim 1 wherein the elevated-temperature solution of step (ii) further comprises co-reactant.

3. The method of claim 1 wherein the mixing pressure is at least 100 psig.

4. The method of claim 1 wherein the temperature of the initiator of step (i) is at most 45° C. and the temperature of the elevated-temperature solution of step (ii) is at least 25° C.

5. The method of claim 1 wherein:
   the combining step (iii) occurs in a mixing chamber; and
   the expanding step (iv) occurs by discharging the mixture of step (iii) into a dispensing chamber.

6. The method of claim 5 further comprising discharging the froth from the dispensing chamber.

7. The method of claim 6 further comprising purging residue of the mixture from the mixing chamber and residue of the froth from the dispensing chamber.

8. The method of claim 1 wherein the combining step (iii) comprises impinging a stream of the initiator of step (i) with a stream of the solution of step (ii).

9. The method of claim 1 wherein:
   the providing step (i) comprises providing a lower-temperature solution comprising:
     a supplemental amount of the polymerizable resin;
     the thermally-activated initiator having the given initiation temperature and the given promoted temperature; and
     carbon dioxide, wherein the temperature of the lower-temperature solution is below the initiation temperature of the initiator; and
   the combining step (iii) comprises combining the lower-temperature solution and the elevated-temperature solution to form the mixture having the temperature above the promoted temperature.

10. The method of claim 9 wherein:
    the elevated-temperature solution is provided at a pressure of at least 100 psig;
    the lower-temperature solution is provided at a pressure of at least 100 psig;
    the combining step (iii) occurs in a mixing chamber; and
    the expanding step (iv) occurs in a dispensing chamber having a pressure of less than 100 psig.

11. The method of claim 10 further comprising dispensing the froth of step (iv) from the dispensing chamber to create the foam of step (v) outside of the dispensing chamber.

12. The method of claim 1 wherein the method is conducted continuously.

13. The method of claim 1 wherein the combining step (iii) occurs intermittently.

14. The method of claim 1 wherein the polymerizable resin comprises triglyceride having acrylate functionality.

15. The method of claim 1 wherein the thermally-activated initiator comprises a peroxide.

16. The method of claim 9 wherein the lower-temperature solution further comprises co-reactant.

17. The method of claim 16 wherein the co-reactant comprises an acrylate.

18. The method of claim 9 wherein the combining step (iii) comprises impinging a stream of the lower-temperature solution with a stream of the elevated-temperature solution.

19. The method of claim 1 wherein the elevated-temperature solution of step (ii) comprises one or more promoters.

20. The method of claim 9 wherein:
the elevated-temperature solution is provided at a pressure of at least 100 psig;
the lower-temperature solution is provided at a pressure of at least 100 psig;
the combining step (iii) occurs in a mixing chamber; and
the expanding step (iv) occurs by discharging the mixture from the mixing chamber to a pressure of less than 100 psig.

* * * * *